(12) United States Patent
Heslin et al.

(10) Patent No.: US 6,593,565 B2
(45) Date of Patent: Jul. 15, 2003

(54) VEHICLE INTERIOR REARVIEW MIRROR ASSEMBLY INCLUDING AN ACCESSORY-CONTAINING HOUSING

(75) Inventors: Patrick Heslin, Glasnevin (IE); Niall R. Lynam, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 09/997,579

(22) Filed: Nov. 29, 2001

(65) Prior Publication Data

US 2002/0113203 A1 Aug. 22, 2002

Related U.S. Application Data

(63) Continuation of application No. 09/433,467, filed on Nov. 4, 1999, now Pat. No. 6,326,613, which is a continuation-in-part of application No. 09/003,966, filed on Jan. 7, 1998, now Pat. No. 6,250,148.

(51) Int. Cl.⁷ .................................................. H01J 5/02
(52) U.S. Cl. ............................. 250/239; 250/214 AL; 359/229
(58) Field of Search ........................ 250/239, 216, 250/21 HAL, 227.11, 214 B; 359/229, 230, 242, 267; 340/485, 461, 602

(56) References Cited

U.S. PATENT DOCUMENTS

| | | | |
|---|---|---|---|
| 4,859,867 A | 8/1989 | Larson et al. | 307/10.1 |
| 4,871,917 A | 10/1989 | O'Farrell et al. | 250/341 |
| 4,916,374 A | 4/1990 | Schierbeek et al. | 318/483 |
| 4,930,742 A | 6/1990 | Schofield et al. | 248/475.1 |
| 4,936,533 A | 6/1990 | Adams et al. | 248/222.1 |
| 4,956,591 A | 9/1990 | Schierbeek et al. | 318/483 |
| 4,973,844 A | 11/1990 | O'Farrell et al. | 250/341 |
| 5,058,851 A | 10/1991 | Lawlor et al. | 248/549 |
| 5,100,095 A | 3/1992 | Haan et al. | 248/549 |
| 5,475,366 A | 12/1995 | Van Lente et al. | 340/525 |
| 5,487,522 A | 1/1996 | Hook | 248/549 |
| 5,572,354 A | 11/1996 | Desmond et al. | 359/265 |
| 5,576,687 A | 11/1996 | Blank et al. | 340/438 |
| 5,615,857 A | 4/1997 | Hook | 248/549 |
| 5,708,410 A | 1/1998 | Blank et al. | 340/438 |

(List continued on next page.)

FOREIGN PATENT DOCUMENTS

| | | |
|---|---|---|
| EP | 0928723 A2 | 7/1999 |
| JP | 6243543 | 2/1987 |
| WO | WO9814974 | 4/1998 |
| WO | WO9830415 | 7/1998 |
| WO | WO9914088 | 3/1999 |
| WO | WO9923828 | 5/1999 |

*Primary Examiner*—Que T. Le
(74) *Attorney, Agent, or Firm*—Van Dyke, Gardner, Linn & Burkhart, LLP

(57) ABSTRACT

A vehicle interior rearview mirror assembly comprises a housing adapted for releasable mounting to a receiving structure on the interior surface of the windshield of a vehicle. A plurality of accessories preferably is included in the housing, with at least one of the plurality of accessories being adapted for viewing through the windshield of the vehicle to which the housing is mounted. Preferably, a rain sensor is included in the housing. A rearview mirror attaches to the housing by a pivot joint, the rearview mirror being pivotally adjustable about the housing and the housing remaining fixedly mounted to the interior surface of the windshield of the vehicle while the rearview mirror is being adjusted. Preferably, electrical wiring passes through the pivot joint. Preferably, an electro-optic mirror is included in the rearview mirror. Various electrical components can be housed in the housing that attaches to the windshield. For example, a compass sensor selected from one of a magneto-resistive sensor, a magneto-inductive sensor, a magneto-capacitive sensor and a flux-gate sensor can be included.

143 Claims, 5 Drawing Sheets

U.S. PATENT DOCUMENTS

| | | |
|---|---|---|
| 5,796,094 A | 8/1998 | Schofield et al. ......... 250/208.1 |
| 5,820,097 A | 10/1998 | Spooner ..................... 248/549 |
| 6,158,655 A | 12/2000 | DeVries, Jr. et al. ....... 235/380 |
| 6,172,613 B1 | 1/2001 | DeLine et al. ........... 340/815.4 |
| 6,198,409 B1 | 3/2001 | Schofield et al. ........... 340/903 |
| 6,222,460 B1 | 4/2001 | DeLine et al. ........... 340/815.4 |
| 6,243,003 B1 | 6/2001 | DeLine et al. ........... 340/425.5 |
| 6,250,148 B1 | 6/2001 | Lynam .................... 73/170.17 |
| 6,313,454 B1 | 11/2001 | Bos et al. ................ 250/208.1 |
| 6,477,464 B2 * | 11/2002 | McCarthy et al. .......... 701/213 |

* cited by examiner

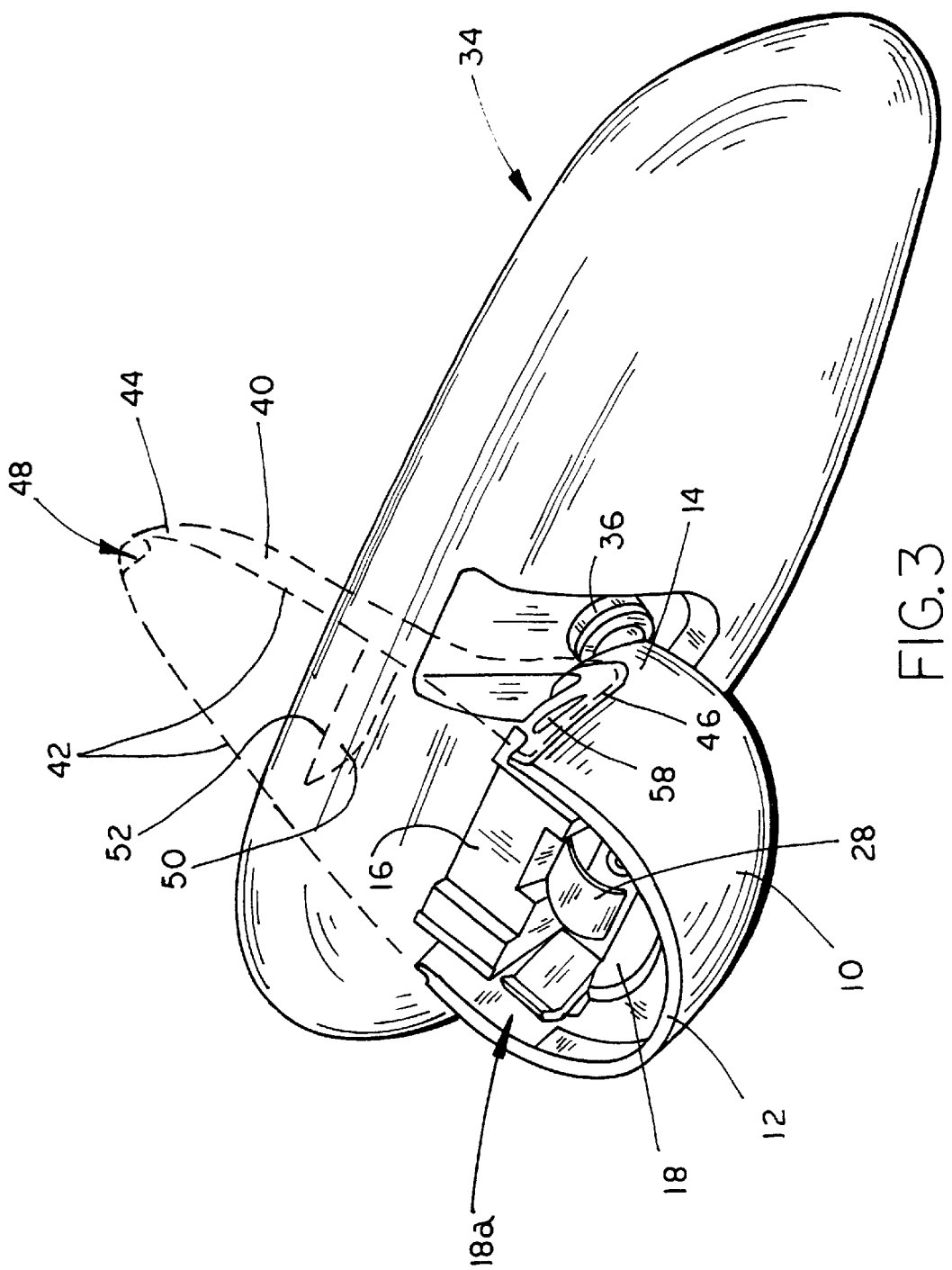

VEHICLE INTERIOR REARVIEW MIRROR ASSEMBLY INCLUDING AN ACCESSORY-CONTAINING HOUSING

CROSS REFERENCE TO RELATED APPLICATION

This is a continuation of U.S. patent application Ser. No. 09/433,467, filed Nov. 4, 1999, entitled VEHICLE INTERIOR MIRROR ASSEMBLY ADAPTED FOR CONTAINING A RAIN SENSOR now U.S. Pat. No. 6,326,613, which is a continuation-in-part of Ser. No. 09/003,966, filed Jan. 7, 1998, by Niall R. Lynam, now U.S. Pat. No. 6,250,148, the disclosures of which are hereby incoworated by reference herein.

BACKGROUND AND SUMMARY OF THE INVENTION

This invention relates to a vehicle interior mirror assembly.

According to the invention there is provided a vehicle interior rearview mirror assembly comprising a housing having a front end for releasable attachment to the interior surface of the vehicle windshield, a rear end having connection means for adjustably mounting a rearview mirror unit to the housing, the housing adapted for containing a rain sensor and biasing means in use biasing the rain sensor into contact with the interior surface of the windshield, the housing containing at least one further electrical component.

The invention further provides a vehicle interior rearview mirror assembly comprising a housing having a front end for releasable attachment to the interior surface of the vehicle windshield, a rear end having connection means for adjustably mounting a rearview mirror unit to the housing, the interior of the housing comprising at least one compartment, the compartment having an opening at the front end of the housing for facing in use towards the windshield and, the compartment adapted for containing a rain sensor and for biasing the rain sensor forwardly through the first opening into contact with the interior surface of the windshield, and the housing also containing at least one further electrical component.

The invention further provides a vehicle interior rearview mirror assembly comprising a housing having a front end for releasable attachment to the interior surface of the vehicle windshield, a rear end having connection means for adjustably mounting a rearview mirror unit to the housing, the interior of the housing comprising a compartment, the compartment having a first opening at the front end of the housing for facing in use towards the windshield and the compartment having a second opening on at least one side of the housing, the compartment containing a rain sensor and means for biasing the rain sensor forwardly through the first opening into contact with the interior surface of the windshield, and the compartment containing at least one further electrical component accessible through the second opening According to the present invention there is provided a vehicle interior rearview mirror assembly comprising a housing having a front end for releasable attachment to the interior surface of the vehicle windshield, a rear end having connection means for mounting a rearview mirror unit to the housing, and an internal wall subdividing the interior of the housing into first and second compartments, the first compartment having a first opening at the front end of the housing for facing in use towards the windshield and the second compartment having a second opening on at least one side of the housing, the first compartment containing a rain sensor and means for biasing the rain sensor forwardly through the first opening into contact with the interior surface of the windshield, and the second compartment containing at least one further electrical component accessible through the second opening.

The invention further provides a vehicle interior rearview mirror assembly comprising a housing having a front end for releasable attachment to the interior surface of the vehicle windshield, a rear end having connection means for releasably mounting a rearview mirror unit to the housing, a first opening at the front end of the housing for facing in use towards the windshield, and a second opening on at least one side of the housing for facing in use towards the top edge of the windshield, the housing containing a rain sensor, means for biasing the rain sensor forwardly through the first opening into contact with the interior surface of the windshield, and at least one further electrical component accessible through the second opening. The assembly further preferably including a removable cover which mates with the housing around the second opening and in use preferably extends along the windshield towards the vehicle header, and electrical leads for the rain sensor and the further electrical component which in use are routed under the cover to the header.

The invention provides the significant advantage that a vehicle manufacturer is provided with the possibility of optionally including a variety of components with the rear view mirror assembly. This possibility is made available for example during the assembly line process where the desired components to meet a particular specification can be included in the rear view mirror assembly. Furthermore, the removable cover readily provides for the functional advantage of readily incorporating a selected component whilst at the same time providing a functionally attractive cover. The automaker is therefore provided with the considerable advantage of the possibility of providing a plurality of diverse options quickly and speedily during the assembly line process.

An embodiment of the invention will now be described, by way of example, with reference to the accompanying drawings, in which:

BRIEF DESCRIPTION OF THE DRAWINGS

FIG. 3 is a perspective top view of the mirror assembly;

In certain of the figures some components are omitted or shown in dashed outline to reveal the underlying structure.

DESCRIPTION OF THE PREFERRED EMBODIMENTS

Figure 2:
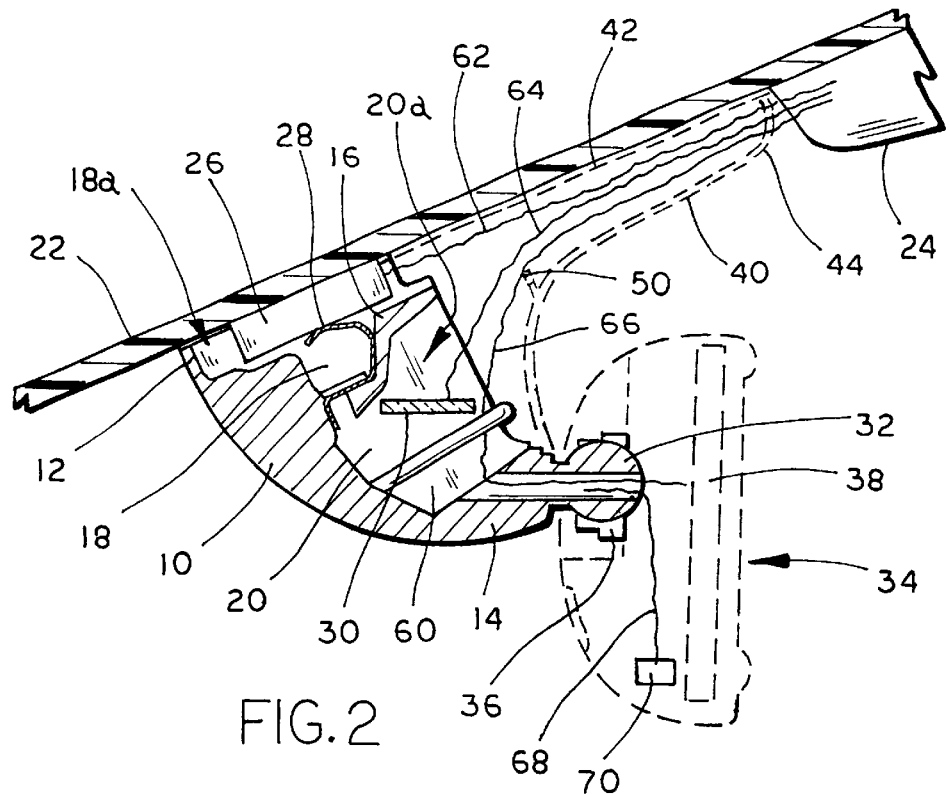
FIG. 2 is a cross-section through the mirror assembly of FIG. 1.
Figure 1:
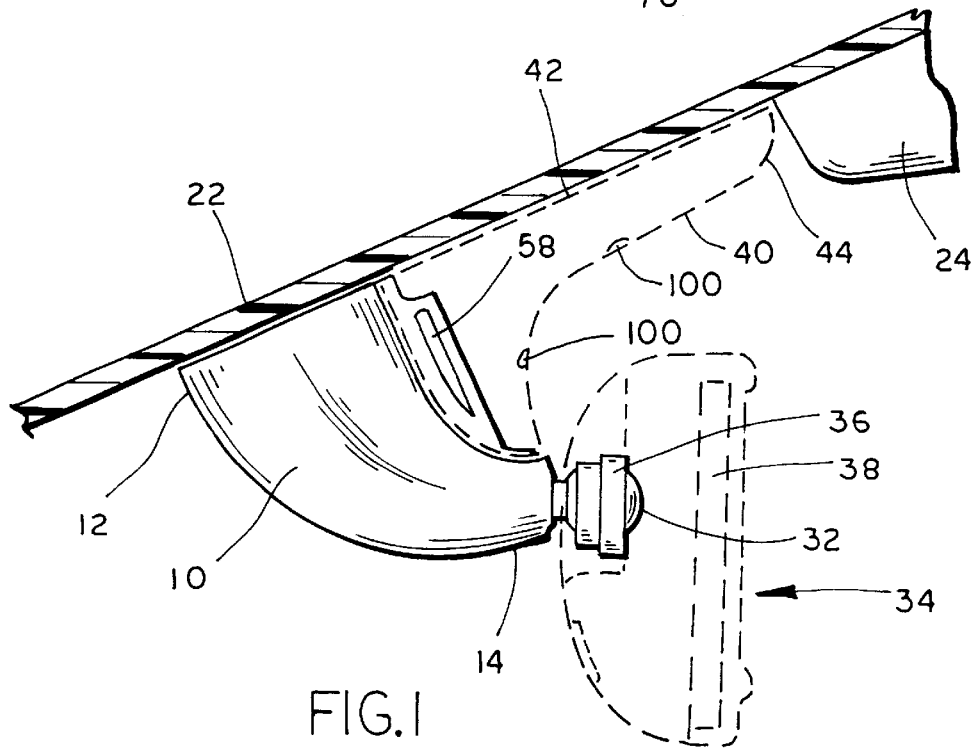
FIG. 1 is a side view of an embodiment of a vehicle interior mirror assembly according to the invention attached to the interior surface of a windshield.
Figure 4:
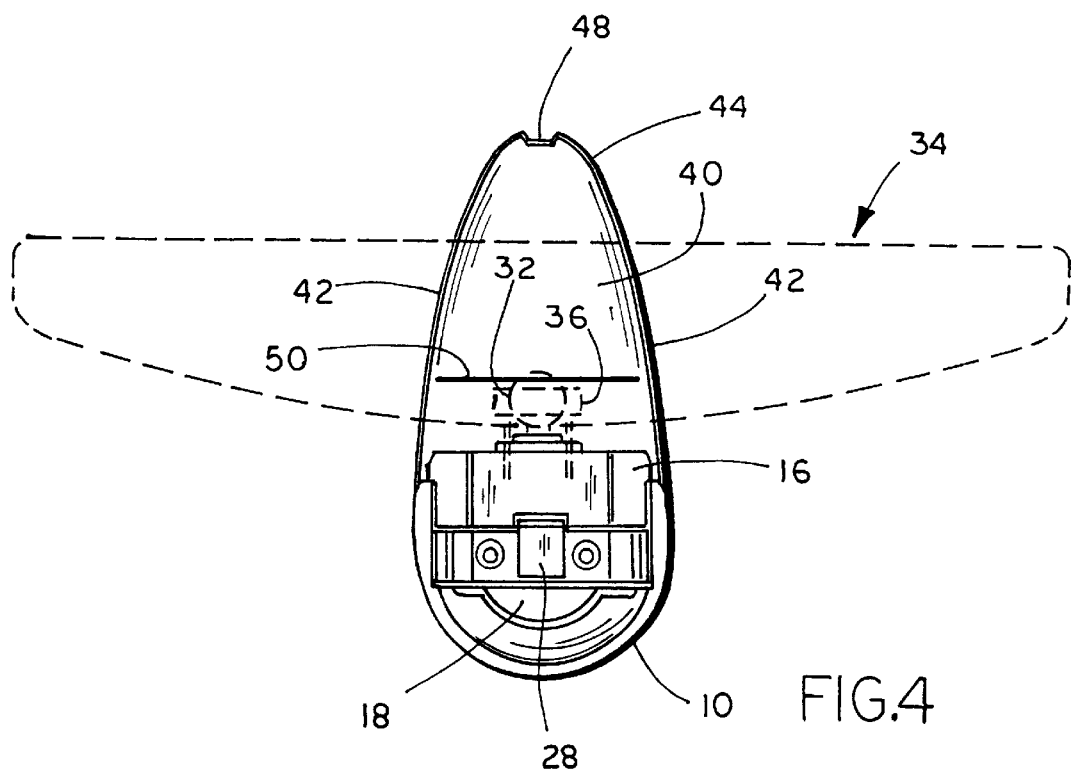
FIG. 4 is a view of the mirror assembly of FIG. 3 looking into the opening 18.

Referring to the drawings, a vehicle interior rearview mirror assembly comprises a die cast metal housing 10 (or optionally may be formed from a plastic moulding such as engineering polymeric resin such as a filled nylon or the like) having a front end 12 and a rear end 14, the front end 12 being releasably attached to the interior surface of the vehicle windshield 22 in a manner to be described. The interior of the housing 10 is subdivided by an internal wall 16 into first and second compartments 18, 20 respectively, the first compartment 18 having an opening 18a at the front end of the housing 10 which in use, and as shown in FIGS. 1 and 2, faces towards the windshield 22 and the second compartment having an opening 20a on the side of the housing which in use faces towards the vehicle header 24 at the top edge of the windshield. The front end 12 of the housing 10 is releasably attached to the windshield 22 using an annular mounting button, not shown, in the manner described in EP 0 928 723 and U.S. patent application Ser. No. 09/003,966, entitled "Rain Sensor Mount for Use in a Vehicle" to Niall R Lynam, now U.S. Pat. No. 6,250,148, the disclosures of which are incorporated herein by reference.

The compartment 18 contains a rain sensor 26, preferably a compact rain sensor module available from ITT Automotive Europe GmbH of Frankfurt, Germany. The compartment 18 preferably also contains an arcuate steel spring finger 28 which is secured to the base of the compartment 18 behind the rain sensor 26 and preferably serves to bias the rain sensor 26 through the aperture in the mounting button and the opening 18a into optical contact with the windshield 22. Most preferably, rain sensor 26 is a module which has a cross section diameter of at least 25 millimeters (mm), more preferably at least 30 mm, but with a maximum diameter $\leq$50 mm, more preferably $\leq$40 mm, and most preferably $\leq$35 mm.

The compartment 20 contains at least one further electrical component which is accessible through the opening 20a. In the present embodiment the component is a printed circuit board 30 bearing a compass sensor such as a flux gate, magnetoinductive, magnetoresistive or magnetocapacitive sensor.

At its rear end 14 the housing 10 has an integral ball 32 for releasably and adjustably mounting a rearview mirror unit 34 to the housing 10 generally in conventional manner. The mirror unit 34 comprises a mirror housing 36 containing a mirror 38 which is preferably an electro-optic mirror comprising front and rear plates separated by a space which contains an electro-optic medium such as an electrochromic medium allowing variation in the amount of light transmitted through the medium by varying the strength of an electric field applied across the medium. Alternatively a prismatic mirror element can be used. Such mirrors are well known in the art. The ball 32 constitutes one part of a ball and socket joint, the socket 36 being carried by the mirror housing 36. The mirror housing is adjustable about the ball and socket joint. Advantageously, the housing 10 is fixedly attached to the windshield when mounted thereto. Thus, adjustment of the mirror housing to set the field of rearward view of the mirror reflective element therein does not effect the position/orientation of rain sensor and any other accessory housed in fixedly-attached housing 10. This is particularly advantageous when the electrical accessory in housing 10 comprises a compass sensor such as a magneto-resistive sensor, a magneto-inductive sensor, a magneto-capacitive sensor or a flux-gate sensor. By having the housing 10 be fixedly attached, and by having it accommodate at least two electrical accessories (at least one of which preferably comprises a rain sensor that is mounted in the housing 10 so as to view through and preferably contact the windshield inner surface, and with the rain sensor attached to the windshield generally coaxial with the mirror unit that is adjustable about housing 10), a compact overall interior mirror system is provided comprising a housing accommodating a plurality of electrical accessories, the housing fixedly and detachably mounted to a receiving structure on the inner surface (typically a glass surface) of the vehicle windshield and with a mirror unit comprising a mirror support arm and a mirror housing including a reflector element, the mirror support arm/mirror housing being adjustable about the fixed housing (and optionally detachable therefrom). In this manner, the housing 10 presents a minimal footprint when viewed from outside the vehicle through the vehicle windshield.

Figure 7:
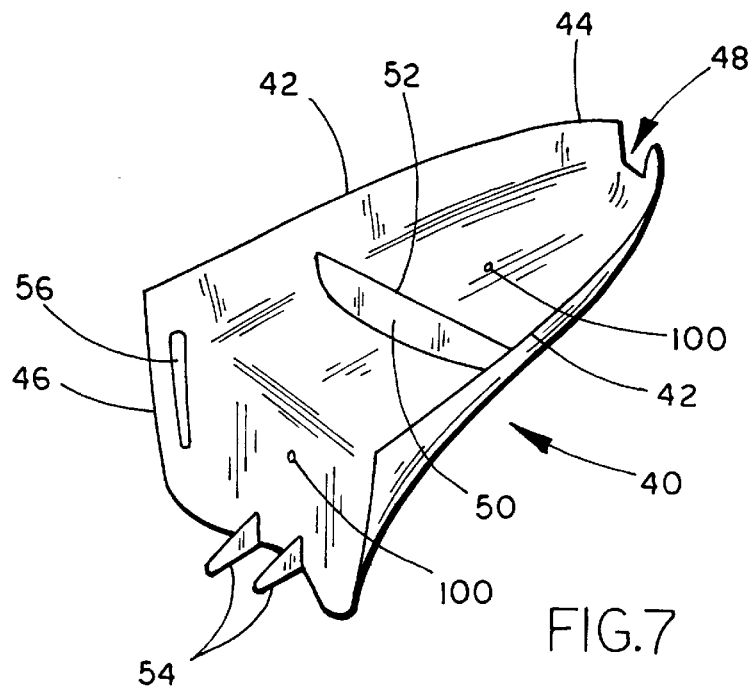
FIG. 7 is a perspective view of the wiring cover forming part of the mirror assembly.

The assembly further includes a removable cover 40 which mates with the housing 10 around the opening 20a and extends along the windshield to the vehicle header 24. The cover 40, which is longitudinally symmetric, is moulded from a resilient, polymeric or plastics material and comprises a pair of opposite, substantially coplanar, longitudinal side edges 42, FIG. 7, which diverge from a relatively narrow rear end 44 of the cover 40 to a relative wide flared front end 46. The flared front end 46 of the cover is open, and there is also a small opening 48 at the narrow rear end 44. The cover 40 has an internal strengthening wall 50 whose free edge 52 is recessed below the level of the edges 42. At its flared front end the cover 40 has a pair of forward projections 54, and the inside surface of the cover has a pair of raised ridges 56 (only one is seen in FIG. 7) each extending along a respective side of the cover adjacent to the front end 46.

The exterior surface of the housing 10 has a corresponding pair of elongated grooves or depressions 58 along each side of the opening 20a, the exterior width of the housing across the opening 20a being substantially the same as the interior width of the cover 40 across the grooves 58.

Figure 5:
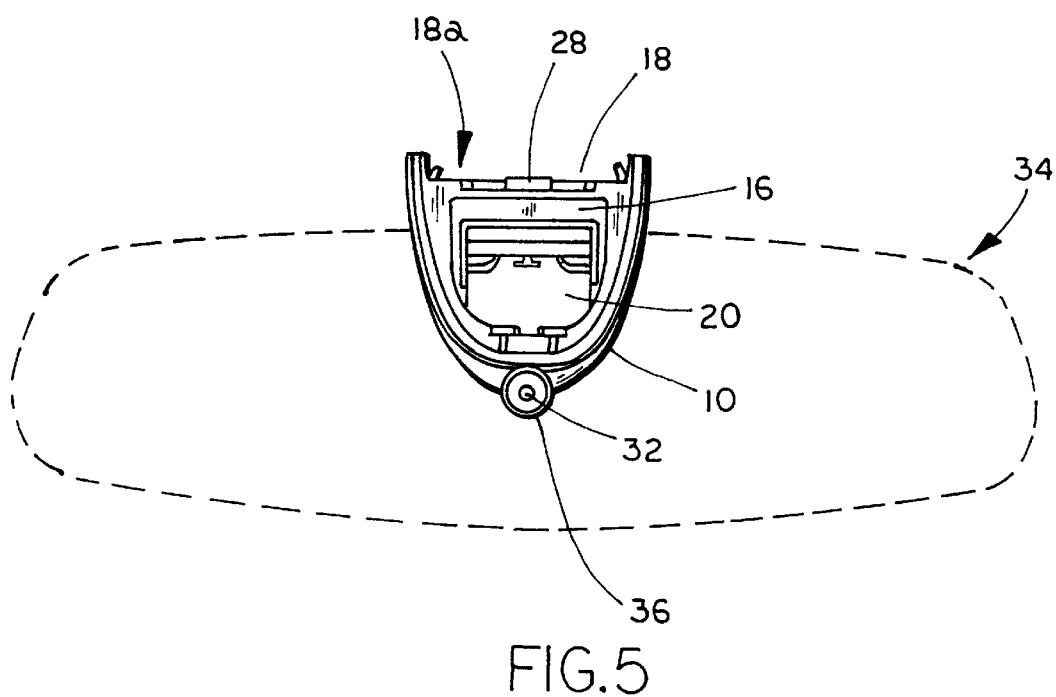
FIG. 5 is a view of the mirror assembly of FIG. 3 looking into the opening 20.
Figure 6:
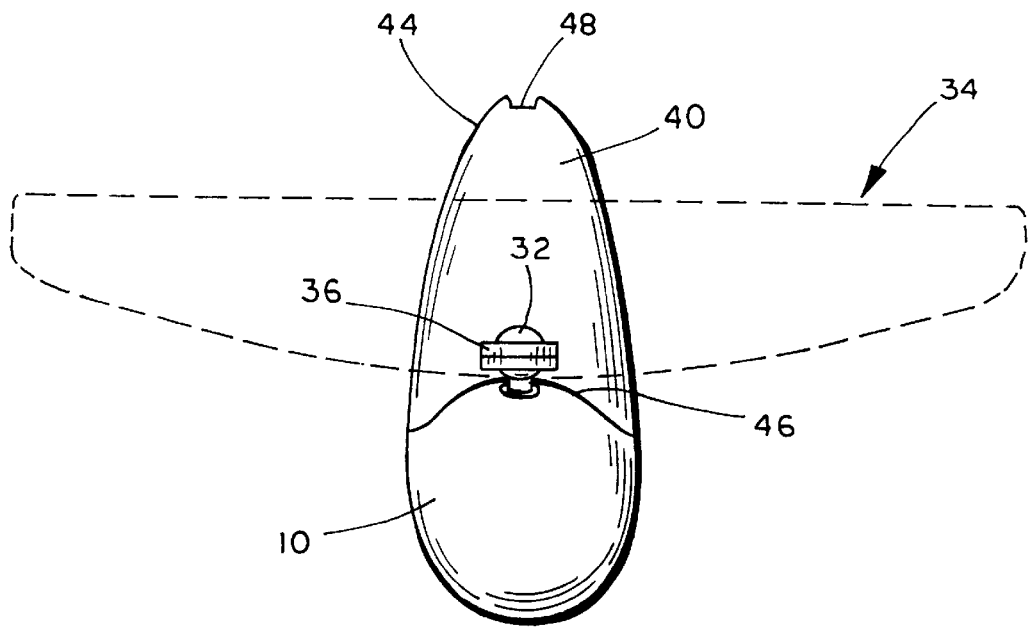
FIG. 6 is a view of the mirror assembly of FIG. 3 looking from underneath.

The cover 40 is fitted to the housing 10 by first inserting the projections 54 into a recess 60, FIGS. 2 and 5, above the opening 20a and then rotating the cover towards the windshield until the ribs 56 snap-engage the grooves 58 (the cover 40 is sufficiently resilient to permit this) and the edges 42 of the cover come to lie flat against the interior surface of the windshield 22, as seen in FIGS. 1 and 2. The cover 40 may be removed by pulling the narrow end 44 away from the windshield until the ribs 56 disengage the grooves 58 and then withdrawing the projection 54 from the recess 60.

The cover 40 serves a dual purpose. First, it protects the compartment 20a and hence the component 30 against the ingress of dust and other contaminants, yet it is easily removed to allow the component 30 to be serviced or replaced, if necessary after removing the mirror unit 34. Secondly, it provides a conduit for electrical leads 62, 64 and 66 respectively from the rain sensor 26, component 30 and (if fitted) the electro-optic or other electrically operated mirror 38.

As seen in FIG. 1, these leads are routed under the cover 40 and through the opening 48 at the rear end 44 of the cover into the vehicle header 24 where they are connected into the vehicle electrical system.

As clearly shown in FIG. 2, the ball joint 32 includes a passageway or a conduit through which can pass the electrical leads connecting to a component such as a electrochromic mirror element 38 or compass display in the mirror head 34. In particular, there is shown a lead 68 connected to a compass display 70 which displays through the mirror element. Alternatively, the display 70 can be located at other positions in the interior rear view mirror assembly, such as in a chin portion or in an eyebrow portion.

Optionally, the removable cover includes at least one opening 100 or port through which a pointed object such as the tip of a ball point pen or a needle or the like can be inserted to activate switches on a PCB located in one of the compartments. Thus, for example, the zone and/or calibration of a compass PCB can be adjusted without the necessity to remove the removable cover.

Figure 8:
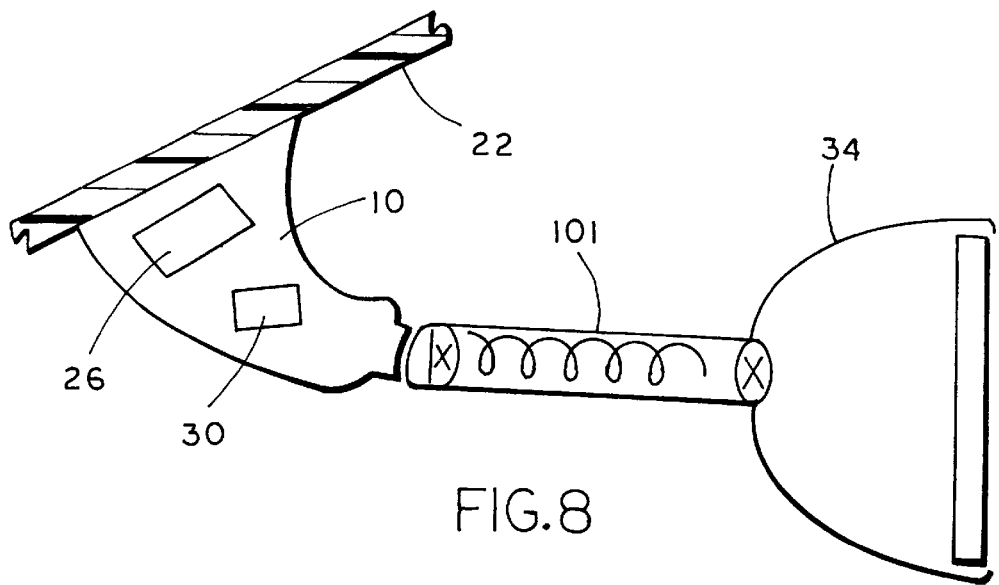
FIG. 8 is a schematic view of another embodiment of vehicle interior mirror assembly according to the invention.
Figure 9:
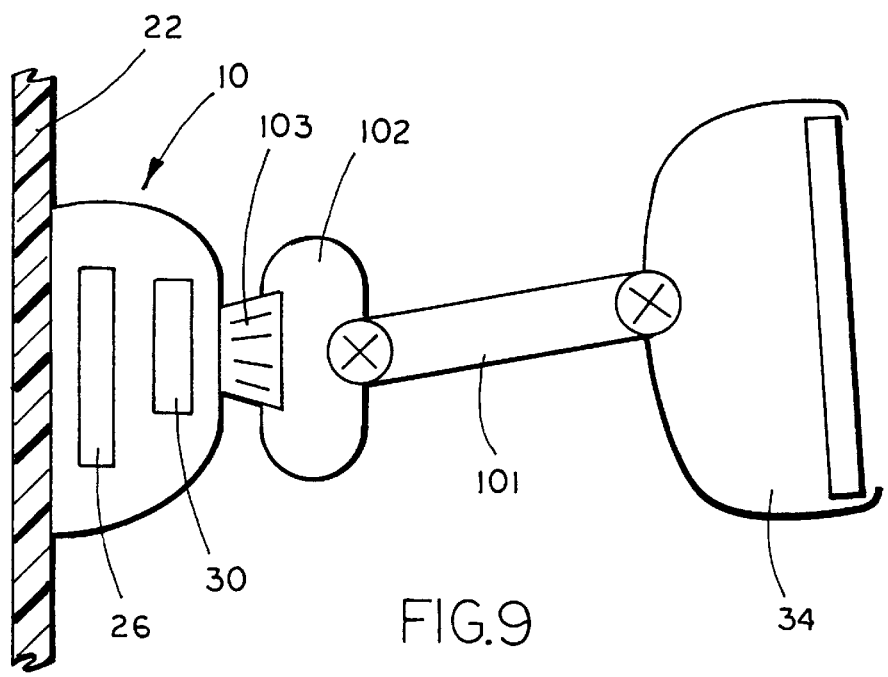
FIG. 9 is a schematic view of yet a further embodiment of a vehicle into rear mirror assembly according to the invention.

Also, a camera may be located on the assembly for example on the housing, or mirror unit or cover and arranged to look either forwardly or rearwardly in terms of the direction of motion of the vehicle, or in another desired direction. In FIGS. 8 and 9 there is shown schematic views of other embodiments of the invention. Thus, in FIG. 8 there is shown the housing 10 containing a rain sensor 26 and another electrical component for example a printed circuit board of a compass sensor 30, with the housing attached to the vehicle windshield 22. The mirror unit 34 is adjustably attached to the housing 10 by a double ball adjustable mirror support arm 101.

In FIG. 9, the mirror support arm 101 is attached to a mirror assembly mount 102. The housing 10 also comprises a mirror assembly mount button 103 which may be fixed to the housing 10 or integrally formed therewith. The mount 102 is detachably attached to the mirror assembly mount button 103.

Although the component 30 has been described as a compass sensor PCB, it can be any of a number of sensors or circuits which can be made small enough to fit in the compartment 20. Preferably, component 30 is provided as a unitary module that is received within compartment 20. Most preferably, component 30 is electrically connected with the electric/electronic wiring provided to the rear view mirror assembly. Thus, an electronic accessory can be provided as a module, can be inserted and received in the rear view mirror assembly, and can make electrical connection (such as by a plug and socket to the rear view mirror assembly). This facilitates and enables the manufacture and supply of the rear view mirror assembly, by a mirror assembly manufacturer, to a vehicle assembly line, and the separate manufacture and supply of the electrical/electronic module to that vehicle assembly line, with the automaker conveniently inserting the electric/electronic module into the compartment of the rear view mirror assembly when the rear view mirror assembly is being mounted on a vehicle passing down a vehicle assembly line.

For example, the compartment 20 may contain a sensor or sensors for vehicle altitude and/or incline, seat occupancy or air bag activation enable/disable, or (if a viewing aperture is made in the housing 10) photosensors for headlamp intensity/daylight intensity measurement. Alternatively, the compartment 20 may contain a transmitter and/or receiver, along with any associated sensors, for geographic positioning satellite (GPS) systems, pagers, cellular phone systems, ONSTAR™ wireless communication, systems, vehicle speed governors, security systems, tire monitoring systems, remote fueling systems where vehicle fueling and/or payment/charging for fuel is remotely achieved, remote keyless entry systems, garage and/or security door opener systems, INTERNET interfaces, vehicle tracking systems, remote car door unlock systems, e-mail systems, toll booth interactions systems, highway information systems, traffic warning systems, home access systems, garage door openers and the like. Of course, any of the above may be mounted under the cover 40, in addition to the component 30 in the compartment 20.

Where the component 30 is a transmitter or receiver, or where a further component mounted under the cover 40 is a transmitter or receiver, the cover 40 may include an associated antenna. The antenna may mounted as a separate item under the cover 40, or the cover itself may serve as the antenna, being either coated with a layer of conductive material or moulded from a conductive plastics material.

Also, a photosensor may be included in a compartment of the housing, preferably a skyward facing photosensor that views skyward through the vehicle windshield for the purpose of providing automatic headlamp activation/deactivation at dusk/dawn. Also, the housing may include a single microphone or a plurality of microphones for detecting vocal inputs from vehicle occupants for the purpose of cellular phone wireless communication.

Most preferably such microphones provide input to an audio system that transmits and communicates wirelessly with a remote transceiver, preferably in voice recognition mode. Such systems are described in commonly assigned, U.S. patent application Ser. No. 09/382,720, filed Aug. 25, 1999, now U.S. Pat. No. 6,243,003, the disclosure of which is hereby incorporated by reference herein.

In this regard it may be desirable to use audio processing techniques such as digital sound processing to ensure that vocal inputs to the vehicular audio system are clearly distinguished from cabin ambient noise such as from wind noise, HVAC, and the like.

Preferably the housing includes an analog to digital converter and or a digital analog converter for the purpose of converting the analog output of the microphone to a digital signal for input to a digital sound processor and for conversion of the digital output of a digital sound processor to an analog signal for wireless transmission to a remote transceiver.

The housing may include a variety of information displays such as a PSIR (Passenger Side Inflatable Restraint) display, an SIR (Side-Airbag Inflatable Restraint), compass/temperature display, a tire pressure status display or other desirable displays, such as those described in commonly assigned, U.S. patent application Ser. No. 09/244,726, filed Feb. 5, 1999, now U.S. Pat. No. 6,172,613, the disclosure of which is hereby incorporated by reference herein.

For example, the interior rearview mirror assembly may include a display of the speed limit applicable to the location where the vehicle is travelling. Conventionally, speed limits are posted as a fixed limit (for example, 45 MPH) that is read by the vehicle driver upon passing a sign. As an improvement to this, an information display (preferably an alphanumerical display and more preferably, a reconfigurable display) can be provided within the vehicle cabin, readable by the driver, that displays the speed limit at whatever location on the road/highway the vehicle actually is at any moment. For example, existing speed limit signs could be enhanced to include a transmitter that broadcasts a local speed limit signal, such signal being received by an in-vehicle receiver and displayed to the driver. The speed limit signal can be transmitted by a variety of wireless transmission methods, such as radio transmission, and such systems can benefit from wireless transmission protocols and standards, such as the BLUETOOTH low-cost, low-power radio based cable replacement or wireless link based on short-range radio-based technology. Preferably, the in-vehicle receiver is located at and/or the display of local speed limit is displayed at the interior mirror assembly (for example, a speed limit display can be located in a chin or eyebrow portion of the mirror case, such as in the mirror reflector itself, such as in the cover 40, or such as in a pod attached to the interior mirror assembly). More preferably, the actual speed of the vehicle can be displayed simultaneously with and beside the local speed limit in-vehicle display and/or the difference or excess thereto can be displayed. Optionally, the wireless-based speed limit transmission system can actually control the speed at which a subject vehicle travels in a certain location (such as by controlling an engine governor or the like). Thus, a school zone speed limit can be enforced by transmission of a speed-limiting signal into the vehicle. Likewise, different speed limits for the same stretch of highway can be set for different classes of vehicles. The system may also require driver identification and then set individual speed limits for individual drivers reflecting their skill level, age, driving record and the like. Moreover, a global positioning system (GPS) can be used to locate a specific vehicle, calculate its velocity on the highway, verify what the allowed speed limit is at that specific moment on that specific stretch of highway, transmit that specific speed limit to the vehicle for display (preferably at the interior rearview mirror that the driver constantly looks at as part of the driving task) and optionally alert the driver or retard the driver's ability to exceed the speed limit as deemed appropriate. A short-range, local communication system such as envisaged in the BLUETOOTH protocol finds broad utility in vehicular applications, and particularly where information is to be displayed at the interior mirror assembly, or where a microphone or user-interface (such as buttons to connect/interact with a remote wireless receiver) is to be located at the interior (or exterior) rearview mirror assembly. For example, a train approaching a railway crossing may transmit a wireless signal such as a radio signal (using the BLUETOOTH protocol or another protocol) and that signal may be received by and/or displayed at the interior rearview mirror assembly (or the exterior sideview mirror assembly). Also, the interior rearview mirror and/or the exterior side view mirrors can function as transceivers/display locations/interface locations for intelligent vehicle highway systems, using protocols such as the BLUETOOTH protocol. Protocols such as BLUETOOTH, as known in the telecommunications art, can facilitate voice/data, voice over data, digital and analogue communication and vehicle/external wireless connectivity, preferably using the interior and/or exterior mirror assemblies as transceiver/display/user-interaction sites. Electronic accessories to achieve the above can be accommodated in housing 10, and/or elsewhere in the intenor mirror assembly (such as in the mirror housing). Examples of such electronic accessories include in-vehicle computers, personal organizers/palm computers such as the Palm Pilot™ personal display accessory (PDA), cellular phones and pagers, remote transaction interfaces/systems such as described in commonly assigned, U.S. patent application Ser. No. 09/057,428, filed Apr. 8, 1998, now U.S. Pat. No. 6,158,655, the disclosure of which is hereby incorporated by reference herein, automatic toll booth payment systems, GPS systems, e-mail receivers/displays, a videophone, vehicle security systems, digital radio station transmission to the vehicle by wireless communication as an alternate to having an in-vehicle dedicated conventional radio receiver, traffic/weather broadcast to the vehicle, preferably digitally, and audio play and/or video display thereof in the vehicle, most preferably at the interior rearview mirror, highway hazard warning systems and the like.

The information display at the interior rearview mirror assembly (such as at the mirror housing or viewable in the mirror reflector) may be formed using electronic ink technology and can be reconfigurable. Examples of electronic ink technology include small plastic capsules or microcapsules, typically $1/10$ of a millimeter across or thereabouts, that are filled with a dark ink and that have in that ink white particles which carry a charge such as a positive charge. Electrodes place an electric field across the capsules and the electric field can attract or repel the charged particles in the capsules. If the white particle is attracted to the top of a capsule so that it is closest to a viewer, the display element/pixel appears white to the viewer. If the white particle is attracted to the bottom of the capsule (away from the viewer), the display element/pixel appears dark as the viewer now sees the dark ink in the capsule. Such displays are available from E Ink of Cambridge, Mass. Such electronic ink displays have the advantage of forming text or graphics that, once formed, do not disappear when the display powering voltage is disconnected (i.e. they have a long display memory). Alternately, GYRICON™ electronic ink technology developed by XEROX Corporation can be used. Here, microbeads are used that are black (or another dark color) on one side and white (or another light color) on the other side. The beads are dipolar in that one hemisphere carries a stronger (and hence different) charge than the opposing other hemisphere. The beads are small (about $1/10^{th}$ of a millimeter diameter) and turn or flip when placed in an electric field, with the respective poles of the dipolar beads being attracted to the corresponding polarity of the applied electric field. Thus, a white pixel or a black pixel can be electrically written. Once the bead has turned or flipped, it remains turned or flipped unless an electric potential of the opposite polarity is applied. Thus, the display has memory.

Other types of information displays can be used at the interior mirror location. For example, a field-emission display such as the field-emission display available from Candescent Technologies of San Jose, Calif. can be used. Field-emission displays include a plurality of charge emitting sources or guns that bombard a phosphor screen. For example, a myriad of small or microscopic cones (<1 micron tall, for example and made of a metal such as molybdenum) are placed about a millimeter from phosphors on a screen. The cones emit electrons from their tips or apexes to bombard the phosphors under an applied electric field. This technology is adaptable to provide thin display screens (such as less than 10 mm or so). Alternately, field-emission displays can be made using carbon nanotubes which are cylindrical versions of buckminsterfullerene, and available from Motorola. Such field-emission displays are particularly useful for video displays as they have high brightness and good contrast ratio, even under high ambient lighting conditions such as in a vehicle cabin by day. Such displays can be located at the interior rearview mirror, preferably, or optionally elsewhere in the vehicle cabin such as in the dash, in the windshield header at the top interior edge of the windshield, in a seat back, or the like.

A further advantage of providing a housing 10 which accommodates multiple electrical accessories, preferably in individual compartments, is that incorporation of optional accessories into a specific vehicle is facilitated. It also facilitates supply of the housing 10 and associated mirror unit by a mirror manufacturer and supply of at least one of the electrical accessories by a second, different accessory manufacturer, and with the automaker placing the at least one electrical accessory into the housing 10 at the vehicle assembly plant, preferably at the vehicle assembly line.

Thus, for example, an interior mirror assembly can be manufactured by a mirror supplier that includes housing 10, compartments 18 and 20 (or, optionally, more compartments), printed circuit board 30 (such as a compass sensor printed circuit board) in compartment 20 but with compartment 18 empty, removable cover 40, a mirror support arm articulating about housing 20, a mirror housing or case supported on said support arm, a reflector element in said mirror housing (preferably an electrochromic mirror element which includes an information display such as of compass direction and/or temperature displaying through said mirror element as is known in the mirror arts). A rain sensor module can be made by a separate manufacturer. The rain sensor module and the interior mirror assembly can be shipped to a vehicle assembly plant (or local to it). Then, when a particular vehicle requires a rains sensor module, the vehicle manufacturer can place the rain sensor module into compartment 18, connect the rain sensor module to the wire harness provided to mirror assembly (preferably, the rain sensor module docks into compartment 18 in a manner that connects it electrically to the vehicle or alternatively, the rain sensor module includes a plug or socket that connects to a corresponding socket or plug already provided in housing 10 (or elsewhere on the interior mirror assembly). This allows "plug & play" accommodation of multiple accessories into the interior rearview mirror assembly. Also, the interior rearview mirror assembly may be shipped to the assembly plant with both compartments 18 and 20 empty, thus allowing, for example, the automaker to solely place a rain sensor module into compartment 18 but add no further accessory into compartment 20.

The invention is not limited to the embodiments described herein which may be modified or varied without departing from the scope of the invention.

What is claimed is:

1. An interior rearview mirror assembly for a vehicle comprising:

a housing for attachment to the interior of the vehicle, said housing adapted for releasable mounting to a receiving structure on the interior surface of the windshield of the vehicle;

a rain sensor included in said housing, said rain sensor adapted for viewing through the windshield of the vehicle on which said housing is mounted;

a rearview mirror comprising a rearview mirror housing, an electro-optic mirror included in said rearview mirror housing, said electro-optic mirror comprising an electro-optic mirror element having front and rear plates and an electro-optic medium disposed between said front and rear plates;

said rearview mirror further comprising a compass display;

said rearview mirror attaching to said housing by a pivot joint, said rearview mirror being pivotally adjustable about said housing, said housing remaining fixedly mounted to the interior surface of the windshield of the vehicle while said rearview mirror is being adjusted;

at least one electrical component included in said housing, said at least one electrical component comprising one of:
   a) a vehicle altitude sensor,
   b) a vehicle incline sensor,
   c) a headlamp sensor,
   d) a daylight sensor,
   e) a geographic positioning satellite (GPS) transmitter,
   f) a geographic positioning satellite (GPS) receiver,
   g) an antenna,
   h) a camera,
   i) a microphone, and
   j) a compass sensor;

said assembly further including electrical wiring for electrically connecting to at least one of said electro-optic mirror and said compass display of said rearview mirror, said electrical wiring passing through said pivot joint.

2. The interior rearview mirror assembly of claim 1 wherein said compass display is positioned to display through said electro-optic mirror element.

3. The interior rearview mirror assembly of claim 1 wherein said rearview mirror housing includes a chin portion and an eyebrow portion, said compass display being positioned to display through one of said chin and said eyebrow portions of said rearview mirror housing.

4. The interior rearview mirror assembly of claim 3 wherein said compass display is positioned to provide a display through said chin portion of said rearview mirror housing.

5. The interior rearview mirror assembly of claim 3 wherein said compass display is positioned to provide a display through said eyebrow portion of said rearview mirror housing.

6. The interior rearview mirror assembly of claim 1 wherein said housing includes a passageway for said electrical wiring.

7. The interior rearview mirror assembly of claim 6 wherein said pivot joint includes a conduit therethrough which receives said electrical wiring, said conduit communicating with said rearview mirror housing and said passageway in said housing.

8. The interior rearview mirror assembly of claim 1 wherein said housing includes a front end for releasable attachment to the interior surface of the windshield of the vehicle, a rear end including said pivot joint, and a biasing member which engages and biases said rain sensor into contact with the interior surface of the windshield.

9. The interior rearview mirror assembly of claim 8 wherein said housing includes a first opening at said front end, said first opening facing toward the windshield when said housing is attached to the interior surface of the windshield, said biasing member biasing said rain sensor forwardly through said first opening into contact with the interior surface of the windshield.

10. The interior rearview mirror assembly of claim 9 wherein said housing comprises a cavity, said cavity including a second opening at said rear end, said electrical component being accessible through said second opening.

11. The interior mirror assembly of claim 10 wherein said housing includes an internal wall separating said cavity into first and second compartments, said rain sensor mounted in a first of said compartments and said electrical component mounted in the second of said compartments.

12. The rearview mirror assembly of claim 11 further including a removable cover which mates with said housing around said second opening and in use extends along the windshield towards vehicle header adjacent the windshield.

13. The interior rearview mirror assembly of claim 12 wherein said electrical wiring electrically connects said rain sensor and said electrical component to the electrical system of the vehicle.

14. The interior rearview mirror assembly of claim 12 wherein said cover is made of a polymeric material which snap-engages said housing around said second opening.

15. The interior rearview mirror assembly of claim 12 wherein said electrical component comprises an antenna.

16. The interior rearview mirror assembly of claim 1 wherein said electrical component comprises a printed circuit board bearing a compass sensor.

17. The interior rearview mirror assembly of claim 1 wherein said housing includes an opening in which said rain sensor is mounted, said assembly further including a biasing member which biases said rain sensor forwardly through said opening into contact with the interior surface of the windshield of the vehicle.

18. The interior rearview mirror assembly of claim 1 wherein said electrical wiring connects to the electrical system of the vehicle.

19. The interior rearview mirror assembly of claim 1 wherein said housing comprises a metal housing.

20. The interior rearview mirror assembly of claim 19 wherein said metal housing comprises a die cast metal housing.

21. The interior rearview mirror assembly of claim 1 wherein said housing comprises a polymeric housing.

22. The interior rearview mirror assembly of claim 21 wherein said polymeric housing comprises a molded polymeric housing.

23. The interior rearview mirror assembly of claim 22 wherein said molded polymeric housing comprises a housing molded from an engineering polymeric resin.

24. The interior rearview mirror assembly of claim 23 wherein said engineering polymeric resin comprises a filled nylon.

25. The interior rearview mirror assembly of claim 1 wherein said rain sensor has a cross section diameter of less than about 50 millimeters.

26. The interior rearview mirror assembly of claim 25 wherein said rain sensor has a cross section diameter of greater than about 25 millimeters.

27. The interior rearview mirror assembly of claim 25 wherein said rain sensor has a cross section diameter of greater than about 30 millimeters.

28. The interior rearview mirror assembly of claim 1 wherein said rain sensor has a cross section diameter of less than about 40 millimeters.

29. The interior rearview mirror assembly of claim 1 wherein said rain sensor has a cross section diameter of less than about 35 millimeters.

30. The interior rearview mirror assembly of claim 1 wherein said rain sensor comprises a rain sensor module.

31. An interior rearview mirror assembly for a vehicle comprising:
   a housing for attachment to the interior of the vehicle, said housing adapted for releasable mounting to a receiving structure on the interior surface of the windshield of the vehicle;
   a rain sensor included in said housing, said rain sensor adapted for viewing through the windshield of the vehicle on which said housing is mounted;
   a rearview mirror comprising a rearview mirror housing, an electro-optic mirror included in said rearview mirror housing, said electro-optic mirror comprising an electro-optic mirror element having front and rear plates and an electro-optic medium disposed between said front and rear plates;
   said rearview mirror attaching to said housing by a pivot joint, said rearview mirror being pivotally adjustable about said housing, said housing remaining fixedly mounted to the interior surface of the windshield of the vehicle while said rearview mirror is being adjusted;
   an electrical component included in said housing, said electrical component comprising a compass sensor, said compass sensor selected from one of a magneto-resistive sensor, a magneto-inductive sensor, a magneto-capacitive sensor and a flux-gate sensor;
   said assembly further including electrical wiring for electrically connecting to an electrical accessory included in said rearview mirror housing, said electrical wiring passing through said pivot joint.

32. The interior rearview mirror assembly of claim 31 wherein said rearview mirror further comprises a compass display and wherein said compass display is positioned to display through said electro-optic mirror element.

33. The interior rearview mirror assembly of claim 31 wherein said rearview mirror further comprises a compass display and wherein said rearview mirror housing includes a chin portion and an eyebrow portion, said compass display being positioned to display through one of said chin and said eyebrow portions of said rearview mirror housing.

34. The interior rearview mirror assembly of claim 33 wherein said compass display is positioned to provide a display through said chin portion of said rearview mirror housing.

35. The interior rearview mirror assembly of claim 33 wherein said compass display is positioned to provide a display through said eyebrow portion of said rearview mirror housing.

36. The interior rearview mirror assembly of claim 31 wherein said housing includes a passageway for said electrical wiring.

37. The interior rearview mirror assembly of claim 36 wherein said pivot joint includes a conduit therethrough which receives said electrical wiring, said conduit communicating with said rearview mirror housing and said passageway in said housing.

38. The interior rearview mirror assembly of claim 31 wherein said housing includes a front end for releasable attachment to the interior surface of the windshield of the vehicle, a rear end including said pivot joint, and a biasing member which engages and biases said rain sensor into contact with the interior surface of the windshield.

39. The interior rearview mirror assembly of claim 38 wherein said housing includes a first opening at said front end, said first opening facing toward the windshield when said housing is attached to the interior surface of the windshield, said biasing member biasing said rain sensor forwardly through said first opening into contact with the interior surface of the windshield.

40. The interior rearview mirror assembly of claim 39 wherein said housing comprises a cavity, said cavity including a second opening at said rear end, said compass sensor being accessible through said second opening.

41. The interior rearview mirror assembly of claim 40 wherein said housing includes an internal wall separating said cavity into first and second compartments, said rain sensor mounted in a first of said compartments and said compass sensor mounted in the second of said compartments.

42. The interior rearview mirror assembly of claim 41 further including a removable cover which mates with said housing around said second opening and in use extends along the windshield towards vehicle header adjacent the windshield.

43. The interior rearview mirror assembly of claim 42 wherein said electrical wiring electrically connects said rain sensor and said compass sensor to the electrical system of the vehicle.

44. The interior rearview mirror assembly of claim 42 wherein said cover is made of a polymeric material which snap-engages said housing around said second opening.

45. The interior rearview mirror assembly of claim 42 wherein said compass sensor comprises one of a magneto-resistive and a magneto-inductive sensor.

46. The interior rearview mirror assembly of claim 31 wherein said compass sensor comprises one of a magneto-resistive and a magneto-inductive sensor.

47. The interior rearview mirror assembly of claim 31 wherein said housing includes an opening in which said rain sensor is mounted, said assembly further including a biasing member which biases said rain sensor forwardly through said opening into contact with the interior surface of the windshield of the vehicle.

48. The interior rearview mirror assembly of claim 31 wherein said electrical wiring connects to the electrical system of the vehicle.

49. The interior rearview mirror assembly of claim 31 wherein said housing comprises a metal housing.

50. The interior rearview mirror assembly of claim 49 wherein said metal housing comprises a die cast metal housing.

51. The interior rearview mirror assembly of claim 39 wherein said housing comprises a polymeric housing.

52. The rearview interior mirror assembly of claim 51 wherein said polymeric housing comprises a molded polymeric housing.

53. The interior rearview mirror assembly of claim 52 wherein said a molded polymeric housing comprises a housing molded from an engineering polymeric resin.

54. The interior rearview mirror assembly of claim 53 wherein said engineering polymeric resin comprises a filled nylon.

55. The interior rearview mirror assembly of claim 21 wherein said housing includes at least one other electrical component, said at least one other electrical component comprising one of:
  a) a vehicle altitude sensor,
  b) a vehicle incline sensor,
  c) a headlamp sensor,
  d) a daylight sensor,
  e) a geographic positioning satellite (GPS) transmitter,
  f) a geographic positioning satellite (GPS) receiver,
  g) an antenna,
  h) a camera, and
  i) a microphone.

56. The interior rearview mirror assembly of claim 31 wherein said electrical accessory included in said rearview mirror housing comprises said electro-optic mirror.

57. The interior rearview mirror assembly of claim 31 wherein said rearview mirror further comprises a compass display and wherein said electrical accessory included in said rearview mirror housing comprises at least one of said electro-optic mirror and said compass display of said rearview mirror.

58. The interior rearview mirror assembly of claim 31 wherein said compass sensor comprises a magneto-inductive sensor.

59. The interior rearview mirror assembly of claim 31 wherein said compass sensor comprises a magneto-resistive sensor.

60. The interior rearview mirror assembly of claim 31 wherein a circuit board bearing said compass sensor is housed in said housing.

61. The interior rearview mirror assembly of claim 31 wherein said rain sensor has a cross section diameter of less than about 50 millimeters.

62. The interior rearview mirror assembly of claim 61 wherein said rain sensor has a cross section diameter of greater than about 25 millimeters.

63. The interior rearview mirror assembly of claim 61 wherein said rain sensor has a cross section diameter of greater than about 30 millimeters.

64. The interior rearview mirror assembly of claim 31 wherein said rain sensor has a cross section diameter of less than about 40 millimeters.

65. The interior rearview mirror assembly of claim 31 wherein said rain sensor has a cross section diameter of less than about 35 millimeters.

66. The interior rearview mirror assembly of claim 31 wherein said rain sensor comprises a rain sensor module.

67. An interior rearview mirror assembly for a vehicle comprising:
  a housing for attachment to the interior of the vehicle, said housing adapted for releasable mounting to a receiving structure on the interior surface of the windshield of the vehicle;
  a plurality of accessories included in said housing, at least one of said plurality of accessories adapted for viewing through the windshield of the vehicle on which said housing is mounted, said at least one of said plurality of accessories comprising one of a rain sensor, a forwardly-viewing camera, and a headlamp sensor;
  a rearview mirror comprising a rearview mirror housing, an electro-optic mirror included in said rearview mirror housing, said electro-optic mirror comprising an electro-optic mirror element having front and rear plates and an electro-optic medium disposed between said front and rear plates;
  said rearview mirror attaching to said housing by a pivot joint, said rearview mirror being pivotally adjustable about said housing, said housing remaining fixedly mounted to the interior surface of the windshield of the vehicle while said rearview mirror is being adjusted;
  an electrical component included in said housing, said electrical component comprising a compass sensor, said compass sensor selected from one of a magneto-resistive sensor, a magneto-inductive sensor, a magneto-capacitive sensor and a flux-gate sensor;
  said assembly further including electrical wiring for electrically connecting to an electrical accessory included in said rearview mirror housing, said electrical wiring passing through said pivot joint.

68. The interior rearview mirror assembly of claim 67 wherein said rearview mirror further comprises a compass display and wherein said compass display is positioned to display through said electro-optic mirror element.

69. The interior rearview mirror assembly of claim 67 wherein said rearview mirror further comprises a compass display and wherein said rearview mirror housing includes a chin portion and an eyebrow portion, said compass display being positioned to display through one of said chin and said eyebrow portions of said rearview mirror housing.

70. The interior rearview mirror assembly of claim 69 wherein said compass display is positioned to provide a display through said chin portion of said rearview mirror housing.

71. The interior rearview mirror assembly of claim 69 wherein said compass display is positioned to provide a display through said eyebrow portion of said rearview mirror housing.

72. The interior rearview mirror assembly of claim 67 wherein said housing includes a passageway for said electrical wiring.

73. The interior rearview mirror assembly of claim 72 wherein said pivot joint includes a conduit therethrough which receives said electrical wiring, said conduit communicating with said rearview mirror housing and said passageway in said housing.

74. The interior rearview mirror assembly of claim 67 wherein said at least one of said plurality of accessories comprises a rain sensor and wherein said housing includes a front end for releasable attachment to the interior surface of the windshield of the vehicle, a rear end including said pivot joint, and a biasing member which engages and biases said rain sensor into contact with the interior surface of the windshield.

75. The interior rearview mirror assembly of claim 74 wherein said housing includes a first opening at said front end, said first opening facing toward the windshield when said housing is attached to the interior surface of the windshield, said biasing member biasing said rain sensor forwardly through said first opening into contact with the interior surface of the windshield.

76. The interior rearview mirror assembly of claim 75 wherein said housing comprises a cavity, said cavity including a second opening at said rear end, said compass sensor being accessible through said second opening.

77. The interior rearview mirror assembly of claim 76 wherein said housing includes an internal wall separating said cavity into first and second compartments, said rain sensor mounted in a first of said compartments and said compass sensor mounted in the second of said compartments.

78. The interior rearview mirror assembly of claim 77 further including a removable cover which mates with said housing around said second opening and in use extends along the windshield towards vehicle header adjacent the windshield.

79. The interior rearview mirror assembly of claim 78 wherein said electrical wiring electrically connects said rain sensor and said compass sensor to the electrical system of the vehicle.

80. The interior rearview mirror assembly of claim 78 wherein said cover is made of a polymeric material which snap-engages said housing around said second opening.

81. The interior rearview mirror assembly of claim 78 wherein said compass sensor comprises one of a magneto-resistive and a magneto-inductive sensor.

82. The interior rearview mirror assembly of claim 67 wherein said compass sensor comprises one of a magneto-resistive and a magneto-inductive sensor.

83. The interior rearview mirror assembly of claim 67 wherein said at least one of said plurality of accessories comprises a rain sensor and wherein said housing includes an opening in which said rain sensor is mounted, said assembly further including a biasing member which biases said rain sensor forwardly through said opening into contact with the interior surface of the windshield of the vehicle.

84. The interior rearview mirror assembly of claim 67 wherein said electrical wiring connects to the electrical system of the vehicle.

85. The interior rearview mirror assembly of claim 67 wherein said housing comprises a metal housing.

86. The interior rearview mirror assembly of claim 85 wherein said metal housing comprises a die cast metal housing.

87. The interior rearview mirror assembly of claim 67 wherein said housing comprises a polymeric housing.

88. The interior rearview mirror assembly of claim 87 wherein said polymeric housing comprises a molded polymeric housing.

89. The interior rearview mirror assembly of claim 88 wherein said molded polymeric housing comprises a housing molded from an engineering polymeric resin.

90. The interior rearview mirror assembly of claim 89 wherein said engineering polymeric resin comprises a filled nylon.

91. The interior rearview mirror assembly of claim 67 wherein said housing includes at least one other electrical component, said at least one other electrical component comprising one of:
   a) a vehicle altitude sensor,
   b) a vehicle incline sensor,
   c) a geographic positioning satellite (GPS) transmitter,
   d) a geographic positioning satellite (GPS) receiver,
   e) an antenna, and
   f) a microphone.

92. The interior rearview mirror assembly of claim 67 wherein said electrical accessory included in said rearview mirror housing comprises said electro-optic mirror.

93. The interior rearview mirror assembly of claim 67 wherein said rearview mirror further comprises a compass display and wherein said electrical accessory included in said rearview mirror housing comprises at least one of said electro-optic mirror and said compass display of said rearview mirror.

94. The interior rearview mirror assembly of claim 67 wherein said compass sensor comprises a magneto-inductive sensor.

95. The interior rearview mirror assembly of claim 67 wherein said compass sensor comprises a magneto-resistive sensor.

96. The interior rearview mirror assembly of claim 67 wherein said housing includes a circuit board bearing said compass sensor.

97. The interior rearview mirror assembly of claim 67 wherein said at least one of said plurality of accessories comprises a rain sensor and wherein said rain sensor has a cross section diameter of less than about 50 millimeters.

98. The interior rearview mirror assembly of claim 97 wherein said rain sensor has a cross section diameter of less than about 40 millimeters.

99. The interior rearview mirror assembly of claim 97 wherein said rain sensor has a cross section diameter of less than about 35 millimeters.

100. The interior rearview mirror assembly of claim 97 wherein said rain sensor has a cross section diameter of greater than about 25 millimeters.

101. The interior rearview mirror assembly of claim 97 wherein said rain sensor has a cross section diameter of greater than about 30 millimeters.

102. The interior rearview mirror assembly of claim 67 wherein said at least one of said plurality of accessories comprises a rain sensor and wherein said rain sensor comprises a rain sensor module.

103. The interior rearview mirror assembly of claim 67 wherein said at least one of said plurality of accessories comprises a rain sensor.

104. The interior rearview mirror assembly of claim 67 wherein said at least one of said plurality of accessories comprises a forwardly-viewing camera.

105. The interior rearview mirror assembly of claim 67 wherein said at least one of said plurality of accessories comprises a headlamp sensor.

106. An interior rearview mirror assembly for a vehicle comprising:
   a housing for attachment to the interior of the vehicle, said housing adapted for releasable mounting to a receiving structure on the interior surface of the windshield of the vehicle;

a plurality of accessories included in said housing, at least one of said plurality of accessories adapted for viewing through the windshield of the vehicle on which said housing is mounted, said at least one of said plurality of accessories comprising one of a rain sensor, a forwardly-viewing camera, and a headlamp sensor;

a rearview mirror comprising a rearview mirror housing, an electro-optic mirror included in said rearview mirror housing, said electro-optic mirror comprising an electro-optic mirror element having front and rear plates and an electro-optic medium disposed between said front and rear plates;

said rearview mirror attaching to said housing by a pivot joint, said rearview mirror being pivotally adjustable about said housing, said housing remaining fixedly mounted to the interior surface of the windshield of the vehicle while said rearview mirror is being adjusted;

an electrical component included in said housing, said electrical component comprising a compass sensor, said compass sensor selected from one of a magneto-resistive sensor, a magneto-inductive sensor, a magneto-capacitive sensor and a flux-gate sensor;

wherein said rearview mirror comprises a compass display and wherein said compass display is positioned to display through one of i) said electro-optic mirror element, ii) a chin portion of said rearview mirror housing, and iii) an eyebrow portion of said rearview mirror housing.

107. The interior rearview mirror assembly of claim 106 wherein said compass display is positioned to display through said electro-optic mirror element.

108. The interior rearview mirror assembly of claim 106 wherein said compass display is positioned to provide a display through said chin portion of said rearview mirror housing.

109. The interior rearview mirror assembly of claim 106 wherein said compass display is positioned to provide a display through said eyebrow portion of said rearview mirror housing.

110. The interior rearview mirror assembly of claim 106 wherein said assembly further includes electrical wiring for electrically connecting to an electrical accessory included in said rearview mirror housing, said electrical wiring passing through said pivot joint and wherein said housing includes a passageway for said electrical wiring.

111. The interior rearview mirror assembly of claim 110 wherein said pivot joint includes a conduit therethrough which receives said electrical wiring, said conduit communicating with said rearview mirror housing and said passageway in said housing.

112. The interior rearview mirror assembly of claim 106 wherein said at least one of said plurality of accessories comprises a rain sensor and wherein said housing includes a front end for releasable attachment to the interior surface of the windshield of the vehicle, a rear end including said pivot joint, and a biasing member which engages and biases said rain sensor into contact with the interior surface of the windshield.

113. The interior rearview mirror assembly of claim 112 wherein said housing includes a first opening at said front end, said first opening facing toward the windshield when said housing is attached to the interior surface of the windshield, said biasing member biasing said rain sensor forwardly through said first opening into contact with the interior surface of the windshield.

114. The interior rearview mirror assembly of claim 113 wherein said housing comprises a cavity, said cavity including a second opening at said rear end, said compass sensor being accessible through said second opening.

115. The interior rearview mirror assembly of claim 114 wherein said housing includes an internal wall separating said cavity into first and second compartments, said rain sensor mounted in a first of said compartments and said compass sensor mounted in the second of said compartments.

116. The interior rearview mirror assembly of claim 115 further including a removable cover which mates with said housing around said second opening and in use extends along the windshield towards vehicle header adjacent the windshield.

117. The interior rearview mirror assembly of claim 116 wherein said assembly further includes electrical wiring which electrically connects said rain sensor and said compass sensor to the electrical system of the vehicle.

118. The interior rearview mirror assembly of claim 116 wherein said cover is made of a polymeric material which snap-engages said housing around said second opening.

119. The interior rearview mirror assembly of claim 116 wherein said compass sensor comprises one of a magneto-resistive and a magneto-inductive sensor.

120. The interior rearview mirror assembly of claim 106 wherein said compass sensor comprises one of a magneto-resistive and a magneto-inductive sensor.

121. The interior rearview mirror assembly of claim 106 wherein said at least one of said plurality of accessories comprises a rain sensor and wherein said housing includes an opening in which said rain sensor is mounted, said assembly further including a biasing member which biases said rain sensor forwardly through said opening into contact with the interior surface of the windshield of the vehicle.

122. The interior rearview mirror assembly of claim 106 wherein said assembly further includes electrical wiring for electrically connecting to an electrical accessory included in said rearview mirror housing, said electrical wiring passing through said pivot joint, said electrical wiring connecting to the electrical system of the vehicle.

123. The interior rearview mirror assembly of claim 122 wherein said electrical accessory included in said rearview mirror housing comprises said electro-optic mirror.

124. The interior rearview mirror assembly of claim 122 wherein said electrical accessory included in said rearview mirror housing comprises at least one of said electro-optic mirror and said compass display of said rearview mirror.

125. The interior rearview mirror assembly of claim 106 wherein said housing comprises a metal housing.

126. The interior rearview mirror assembly of claim 125 wherein said metal housing comprises a die cast metal housing.

127. The interior rearview mirror assembly of claim 106 wherein said housing comprises a polymeric housing.

128. The interior rearview mirror assembly of claim 127 wherein said polymeric housing comprises a molded polymeric housing.

129. The interior rearview mirror assembly of claim 128 wherein said molded polymeric housing comprises a housing molded from an engineering polymeric resin.

130. The interior rearview mirror assembly of claim 129 wherein said engineering polymeric resin comprises a filled nylon.

131. The interior rearview mirror assembly of claim 106 wherein said housing includes at least one other electrical component, said at least one other electrical component comprising one of:

a) a vehicle altitude sensor, b) a vehicle incline sensor, c) a geographic positioning satellite (GPS) transmitter, d) a geographic positioning satellite (GPS) receiver, e) an antenna, and f) a microphone.

132. The interior rearview mirror assembly of claim 106 wherein said compass sensor comprises a magneto-inductive sensor.

133. The interior rearview mirror assembly of claim 106 wherein said compass sensor comprises a magneto-resistive sensor.

134. The interior rearview mirror assembly of claim 106 wherein said housing includes a circuit board bearing said compass sensor.

135. The interior rearview mirror assembly of claim 106 wherein said at least one of said plurality of accessories comprises a rain sensor and wherein said rain sensor has a cross section diameter of less than about 50 millimeters.

136. The interior rearview mirror assembly of claim 135 wherein said rain sensor has a cross section diameter of less than about 40 millimeters.

137. The interior rearview mirror assembly of claim 135 wherein said rain sensor has a cross section diameter of less than about 35 millimeters.

138. The interior rearview mirror assembly of claim 135 wherein said rain sensor has a cross section diameter of greater than about 25 millimeters.

139. The interior rearview mirror assembly of claim 135 wherein said rain sensor has a cross section diameter of greater than about 30 millimeters.

140. The interior rearview mirror assembly of claim 106 wherein said at least one of said plurality of accessories comprises a rain sensor and wherein said rain sensor comprises a rain sensor module.

141. The interior rearview mirror assembly of claim 106 wherein said at least one of said plurality of accessories comprises a rain sensor.

142. The interior rearview mirror assembly of claim 106 wherein said at least one of said plurality of accessories comprises a forwardly-viewing camera.

143. The interior rearview mirror assembly of claim 106 wherein said at least one of said plurality of accessories comprises a headlamp sensor.

* * * * *

UNITED STATES PATENT AND TRADEMARK OFFICE
CERTIFICATE OF CORRECTION

PATENT NO. : 6,593,565 B2  
APPLICATION NO. : 09/997579  
DATED : July 15, 2003  
INVENTOR(S) : Heslin et al.

It is certified that error appears in the above-identified patent and that said Letters Patent is hereby corrected as shown below:

Column 1,  
Line 14, "incorwarated" should be -- incorporated --.

Column 7,  
Line 52, "intenor" should be -- interior --.

Column 10,  
Line 51, insert -- rearview -- after "interior".  
Line 56, insert -- interior -- before "rearview".

Column 13,  
Line 23, "rearview interior" should be -- interior rearview --.

Signed and Sealed this

Twentieth Day of June, 2006

JON W. DUDAS  
*Director of the United States Patent and Trademark Office*